H. C. ROOT.
CONTROLLING VALVE FOR VACUUM OPERATED POWER MEANS.
APPLICATION FILED MAY 9, 1917.
1,321,150.
Patented Nov. 11, 1919.
2 SHEETS—SHEET 1.
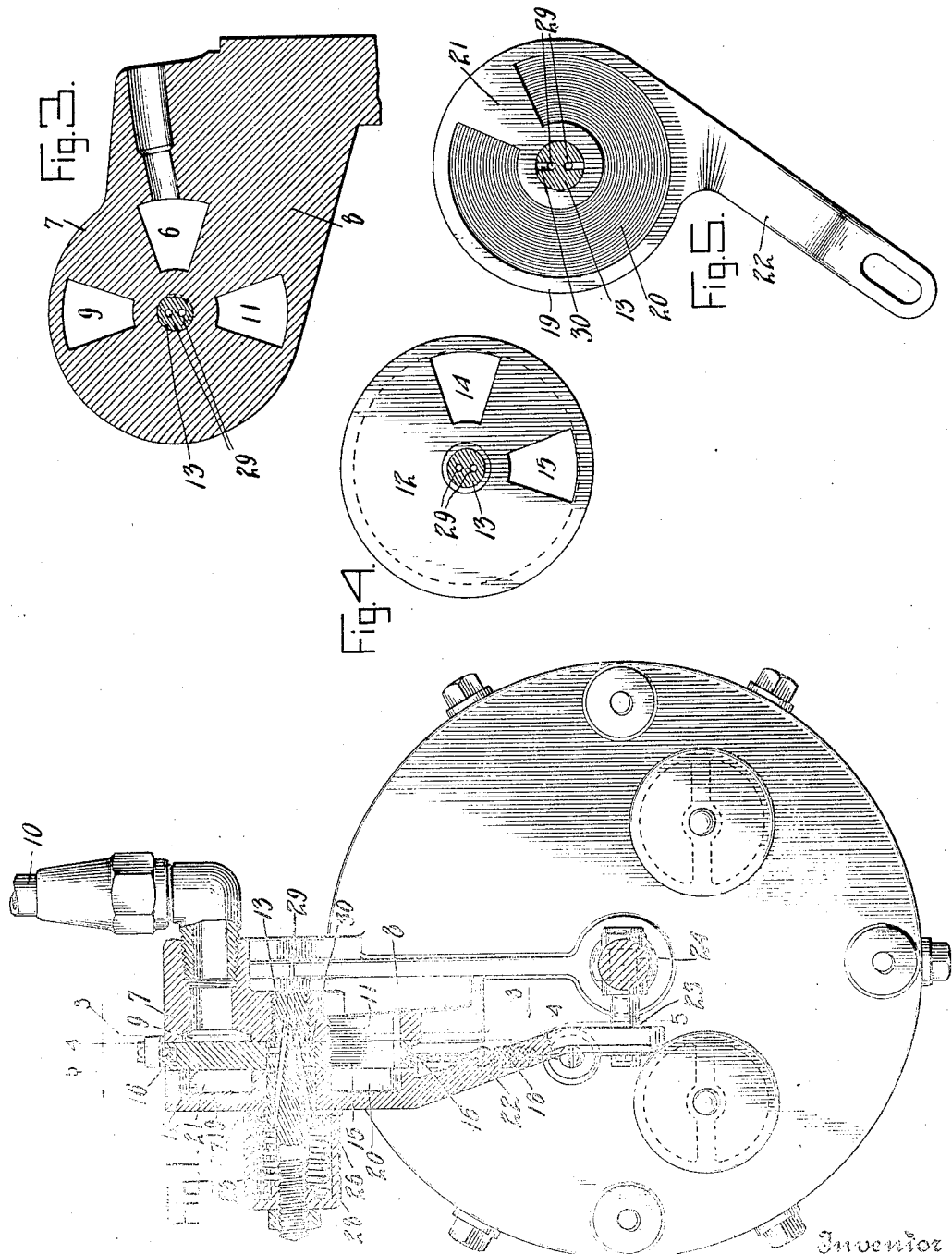

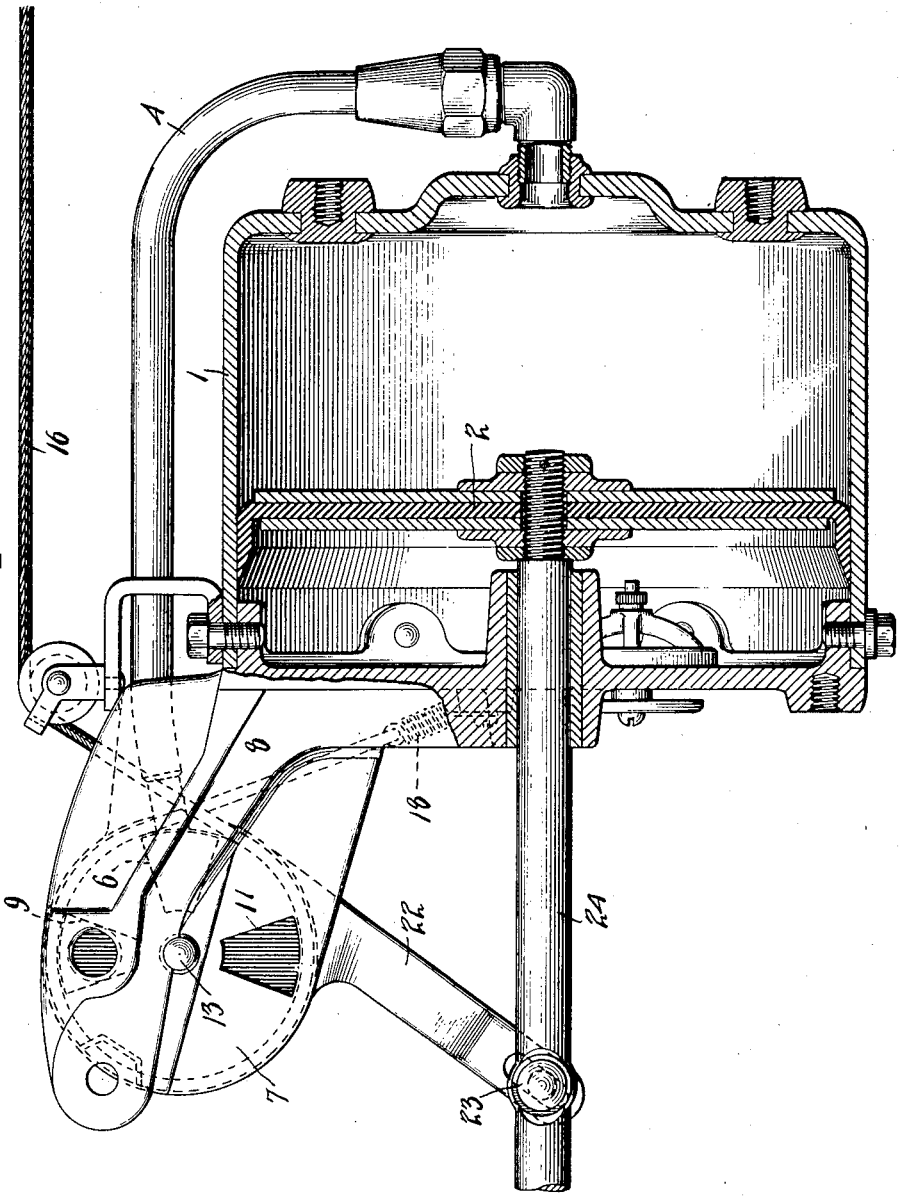

UNITED STATES PATENT OFFICE.

HOWARD C. ROOT, OF INDIANAPOLIS, INDIANA, ASSIGNOR TO THE PREST-O-LITE COMPANY, INC., OF INDIANAPOLIS, INDIANA, A CORPORATION OF NEW YORK.

CONTROLLING-VALVE FOR VACUUM-OPERATED POWER MEANS.

1,321,150.        Specification of Letters Patent.        Patented Nov. 11, 1919.

Application filed May 9, 1917. Serial No. 167,595.

*To all whom it may concern:*

Be it known, that I, HOWARD C. ROOT, a citizen of the United States, residing at Indianapolis, Marion county, and State of Indiana, have invented and discovered certain new and useful Improvements in Controlling-Valves for Vacuum-Operated Power Means, of which the following is a specification.

My invention relates to fluid pressure controlling valves, and particularly to valves adapted to control the operation of a vacuum operated cylinder and piston. The invention is particularly adapted for use in connection with power brakes employed on motor vehicles.

The principal objects of the invention are to provide means to control the degree of vacuum formation with a certain load, solely by the extent of movement of a fluid pressure governing valve, to thereby proportion the vacuum to the load and proportion the movement of a load of predetermined amount to the extent of opening of the valve, and to provide a valve mechanism for accomplishing this end which is mechanically operated both for controlling the vacuum-creating suction and for automatically cutting off the suction after the application of power, whereby difficulties in operation due to a valve operated by differential fluid pressures are obviated. Another object of the invention is to provide a construction of the valve such that dirt and dust will be effectively excluded from the movable contact parts thereof while at the same time the bearings may be effectively lubricated.

With these objects in view, my invention is embodied in preferable form in the construction and arrangement hereinafter described and illustrated in the accompanying drawings.

In these drawings Figure 1 is an end view in elevation, partly in vertical section, showing one end of a vacuum cylinder with my improvement applied thereto; Fig. 2 a central horizontal section, partly in elevation, of the cylinder and valve; Fig. 3, a detail plan view of the valve; Fig. 4, a similar view of the main movable controlling disk of the valve, and Fig. 5 a similar view of the automatic cut off disk of the valve.

Referring to the drawings, 1 indicates an air-tight cylinder and 2 indicates a vacuum operated, air-tight piston movable in the cylinder. This piston is adapted to be connected to a suitable driven element such as the brake rod of an automobile, and which part is not herein illustrated. The piston is adapted to be forced forward by atmospheric pressure toward the right hand end of the cylinder illustrated in Fig. 2, when a vacuum or partial vacuum is induced in front of the piston by means of the establishment of a suction force on the forward part of the cylinder. The piston is adapted to be drawn back to normal, inoperative position at the left hand of the cylinder as viewed in Fig. 2 by means of a suitable return spring connected to the driven element mechanism and not herein shown.

Leading from the front end of the cylinder is a vacuum line consisting of a pipe 4 which is subject to a suction from a suitable source. This pipe communicates with a segmental port 6 formed in a disk 7 which is fixed upon and forms part of a bracket 8 which is preferably mounted upon the rear face of the cylinder 1. The disk 7 is provided with a port 9 on an axis which is at an angle of 90° to the axis of the port 6 and which port 9 is in open communication with a vacuum line consisting of a pipe 10 leading to a suitable suction-creating source such as the intake manifold of an internal combustion engine (not herein shown.) The disk 7 is also provided with a port 11 the axis of which is 90° to the axis of the port 6 and diametrically opposite the axis of the port 9. This disk is provided with a flat ground inner surface against which bears the similar surface of a main controlling valve disk which is mounted for oscillatory, adjustable movement upon a fixed bearing stem of a bolt 13, the inner end of which is threaded into the fixed disk. The disk 12 is provided with a segmental port 14 adapted to register with the port 6 leading to the cylinder when the parts are in normal, inoperative position, and with a port 15 adapted to register with the atmospheric port 11 in disk 7 when the parts are in said position. The rim of the main disk 12 is grooved and is adapted to receive a flexible stranded cable 16 which is secured to said disk by means of a clamp 17 and which cable constitutes the connecting means between a suitable operating handle or pedal adapted to be manually controlled, and not herein shown, and the said disk. The cable runs over the disk and at its inner end is connected to a spiral return spring 18 which is adapted to return the disk to normal, inoperative position after tension is released on the flexible connecting member.

Mounted on the stem 13, for oscillatory, adjustable movement thereon, is an automatic cut-off valve disk 19 which has a ground surface contact against the outer face of the main control disk 12. This cut-off valve member is provided with a circularly elongated transfer port 20 which leaves between the ends thereof a blank closing and cut-off section 21. In the normal, inoperative position of the valve, the port 20 of the disk 19 is in registry with the ports 14 and 15 of the disk 12 and the ports 6 and 11 of the fixed disk 7, and also lies over the vacuum or suction port 9 of said disk 7, and the blank space thereof lies over the blank space between the ports 6 and 9 of said fixed disk. The port 20 is formed by a recess on the inner surface of the disk 19 and is, therefore, a channel port which constitutes a transfer passage-way adapted to normally lie over the suction or vacuum port of the fixed disk 7 and the atmospheric or exhaust port thereof and is controlled in such communication by the intermediate main disk 12, which in such normal position interrupts the communication by its blank space above port 14. The disk 19 is provided with an operating arm 22 which is pivotally joined by a loose connection 23, to the piston rod 24. The two movable disks of the valve are held yieldingly but firmly in contact with one another, and the intermediate disk of the two against the fixed disk by means of a spiral spring 25, pressing against a metal washer 26, which in turn bears against a leather washer 27 in contact with the disk 19. This spring is inclosed in a grease cup 28 threaded on the outer threaded end of the bolt 13. This bolt is provided with lubricating grooves 29 leading therethrough and communicating with radial lubricant-conveying passage-ways 30 which serve to supply lubricating material to the annular bearing portions of the valve disks. By means of the flat ground faces of the disks the same are held in close contact, and dirt and dust are thus excluded.

In the operation of the device, when it is desired to effect the movement of the piston so as to operate the driven element, a pull is exerted in the direction of the arrow on the operating cable 16 by pressure on a suitable handle or foot pedal by the operator, which has the effect of turning the valve disk 12 through 90° until its port 14 is carried into registry with the port 9 of the fixed disk 7, and the port 15 into registry with the port 6. Since the port 9 communicates with the vacuum or suction line and the port 6 with the cylinder line 4 communication will be established from the suction creating source through the port 9, port 20 of the disk 19, and port 15 and port 6 to the brake cylinder, thus establishing a suction in the brake cylinder in front of the piston, whereupon, owing to the vacuum or partial vacuum thus created, the piston will be forced forward by the atmospheric pressure behind it and thus operate the driven element. In this forward movement of the piston the piston rod 24 will carry forward the arm 22 of the valve disk 19 until the blank space thereof is carried over the suction or vacuum port 9 and port 14, thus proportionally decreasing the vacuum or entirely cutting off communication between the suction line and the cylinder, according to the degree of movement of the piston, as determined by the extent of opening of the control valve. However, a vacuum or a partial vacuum will still exist in front of the piston and consequently the same will remain forward with the driven element thereof maintained in operative position. When it is desired to return the driven element, pressure is removed on the operating member by the operator, whereupon, the return spring 18 will retract the cable 16 and carry back the main valve disk 12 to its original position in which port 14 will register with the port 6 of the fixed disk 7 and the port 15 of the movable disk will register with the port 11 of the fixed disk and communication will be established from the atmosphere to the cylinder through the transfer channel port 20, thus admitting air through the line 4 to the cylinder in front of the piston and thus balancing the fluid pressure on said piston and permitting the return spring to retract the piston to its normal position.

It will be seen that the function of the cut-off valve 19, is to automatically cut-off or decrease communication between the suction creating source and the cylinder preliminarily to the releasing movement of the main valve disk 12, so that when the atmospheric air is admitted to the cylinder by the return movement of the main valve disk there is no suction on the cylinder. Were it not for this action of the cut-off valve a suction in the cylinder would still exist from the atmosphere through the suction line and to the source where the main valve disk was turned back to inoperative position, which would tend to prevent the return of the piston. Since the main control valve is positively and manually opened and closed and governs directly by the extent of its opening, the degree of suction exerted on the cylinder and the cut-off is mechanically operated proportionately to the piston and main valve movement the amount of vacuum created under a given load is proportioned exactly to the extent of valve opening and the movement of the load is properly graduated and proportioned to the rate of formation of the vacuum in the cylinder.

Having thus described my invention, what I claim is:

1. A valve mechanism for fluid medium operated power applying means having a manually controlled valve member operable to control the communication between the source of power and the said means, and between the same and the atmosphere and a supplementary automatic cut-off valve member associated with the first valve member and operable intermediately of the power applying and return actuations of the manually controlled valve, to cut off the communication between said source and power means.

2. In a vacuum operated power applying means, in combination with a cylinder and a power applying piston movable therein, means of communication between said cylinder on one side of the piston and a source of suction, valve means for controlling the suction communication to establish a vacuum on said side of the cylinder, means controlled by said valve for establishing communication between the cylinder and the atmosphere and means automatically operable by the piston for cutting off communication from the suction line to the cylinder.

3. In a vacuum operated power applying means, in combination with a cylinder and a power piston movable therein, means for operating a vacuum on one side of said piston, valve means for controlling the creation of said vacuum and automatic cut-off valve means operable mechanically by the operating movement of the piston and between the cylinder and the vacuum creating means to proportionately interrupt the communication.

4. In a vacuum operated power applying means, in combination with a cylinder having communication with a source of suction adapted to establish a vacuum in said cylinder, a power applying piston movable in said cylinder valve means controlling communication between said source and cylinder and between the latter and the atmosphere, means for manually operating said valve means, cut-off valve means having operative mechanical connection with the piston and controlling communication between said source and the cylinder, and means for operating said cut-off valve, means to decrease or interrupt said communication between the power applying and return actuations of the said controlling valve.

5. In a vacuum operated power applying means, in combination with a cylinder having communication with a suction creating source and with the atmosphere, a power piston movable in the cylinder, a valve mechanism controlling said lines of communication, and including a manually operated ported valve member, a supplemental valve having a transfer port controlling the suction line, and means connecting the supplemental valve with the piston and adapted to operate said valve to shut off communication with the suction line in the working stroke of the piston.

6. In combination with vacuum operated power applying means, a suction line between said means and a source of suction, means of communication between said line and the atmosphere, a valve mechanism for controlling said communications including a fixed disk having ports separately communicating with the suction line, power applying means and atmosphere, a movable manually operated valve disk having a plurality of ports and a supplementary valve disk having a transfer port and operable conjointly with said first movable disk for controlling said communications, and means for automatically operating said second valve disk independently of the first disk to cut off or retain the communication with the suction line.

In witness whereof, I have hereunto set my hand and seal at Indianapolis this 16th day of April, A. D. nineteen hundred and seventeen.

HOWARD C. ROOT. [L. S.]

Witnesses:
H. P. DOOLITTLE,
M. L. SHULER.